United States Patent
Duvall et al.

(10) Patent No.: US 7,025,904 B2
(45) Date of Patent: *Apr. 11, 2006

(54) METHOD FOR IMPROVING ADHESION OF WATER-BASED INKS TO HALOGEN-CONTAINING RESIN ARTICLES

(75) Inventors: Tod C. Duvall, West Chester, OH (US); Jeffery L. Carpenter, Cincinnati, OH (US)

(73) Assignee: Rohm and Haas Company, Philadelphia, PA (US)

( * ) Notice: Subject to any disclaimer, the term of this patent is extended or adjusted under 35 U.S.C. 154(b) by 61 days.

This patent is subject to a terminal disclaimer.

(21) Appl. No.: 10/655,459

(22) Filed: Sep. 4, 2003

(65) Prior Publication Data

US 2004/0077753 A1  Apr. 22, 2004

Related U.S. Application Data

(60) Division of application No. 09/320,304, filed on May 26, 1999, now Pat. No. 6,706,792, which is a continuation-in-part of application No. 09/133,605, filed on Aug. 13, 1998, now Pat. No. 6,528,566, which is a continuation-in-part of application No. 09/048,492, filed on Mar. 26, 1998, now abandoned, which is a continuation-in-part of application No. 08/890,613, filed on Jul. 9, 1997, now abandoned, which is a continuation-in-part of application No. 08/597,093, filed on Feb. 23, 1996, now abandoned, which is a continuation-in-part of application No. 08/435,413, filed on May 10, 1995, now abandoned.

(51) Int. Cl.
*C07F 9/02* (2006.01)
*C07C 319/00* (2006.01)
*C08K 5/15* (2006.01)
*C09K 15/32* (2006.01)

(52) U.S. Cl. .............. 252/400.1; 252/400.62; 252/402; 252/406; 568/8; 568/13; 568/45; 568/51; 568/55; 524/110; 524/392

(58) Field of Classification Search ........... 568/8, 568/13, 45, 51, 55; 252/402, 400.1, 400.54, 252/400.62, 406; 524/110, 392

See application file for complete search history.

(56) References Cited

U.S. PATENT DOCUMENTS

| 3,067,166 | A | 12/1962 | Zaremsky |
| 4,857,572 | A | 8/1989 | Meier et al. |
| 4,973,619 | A | 11/1990 | Kemper |
| 5,352,723 | A | 10/1994 | Tanno et al. |

FOREIGN PATENT DOCUMENTS

| EP | 0 742 259 A | 11/1996 |
| EP | 0 890 608 A | 1/1999 |
| EP | 0 945 485 A | 9/1999 |
| WO | 9 615186 | 5/1996 |

*Primary Examiner*—Peter D. Mulcahy
(74) *Attorney, Agent, or Firm*—Marcella M. Bodner; Carl Hemenway

(57) ABSTRACT

Flexible and semi-rigid vinyl chloride resin compositions comprising a combination of a latent mercaptan and a zinc salt of oxidized polyethylene (a zinc ionomer) as a heat stabilizer are substantially free from the offensive odor typically associated with mercaptans and are protected during processing by the degradation products of the latent mercaptan and the zinc ionomer. The oxidized polyethylene is split out from the ionomer to act as an adhesion promoter for aqueous inks and paints, and the residual zinc carboxylate functions as a co-stabilizer with the latent mercaptan in the composition. The latent mercaptan is exemplified by a 2-S-(tetrahydropyranyl)thioalkanol, a carboxylic acid ester thereof, a 2-S-(tetrahydropyranyl)-thiocarboxylic acid, an ester thereof, and the furanyl homologs of each.

7 Claims, No Drawings

METHOD FOR IMPROVING ADHESION OF WATER-BASED INKS TO HALOGEN-CONTAINING RESIN ARTICLES

CROSS REFERENCE TO RELATED PATENT APPLICATIONS

This is a divisional of application U.S. Ser. No. 09/320,304, filed May 26, 1999, now U.S. Pat. No. 6,706,792 which was a continuation-in-part of U.S. Ser. No. 09/133,605, filed Aug. 13, 1998, now issued as U.S. Pat. No. 6,528,566, which was a continuation-in-part of U.S. Ser. No. 09/048,492, filed Mar. 26, 1998, now abandoned, which was a continuation-in-part of U.S. Ser. No. 08/890,613, filed Jul. 9, 1997, now abandoned, which was a continuation-in-part of U.S. Ser. No. 08/597,093, filed Feb. 23, 1996, now abandoned, which was a continuation-in-part of U.S. Ser. No. 08/435,413, filed May 10, 1995, now abandoned.

FIELD OF THE INVENTION

This invention relates to improved adhesion of water-based inks and paints to articles made from heat stabilized halogen-containing resins. It relates particularly to articles of manufacture such as flexible film and semi-rigid tubing that are prepared from heat-stabilized vinyl chloride polymers.

BACKGROUND OF THE INVENTION

Changes in heat stabilizers and in printing inks over the years has resulted in a loss of printability of flexible poly (vinyl chloride) substrates. The curtailment of heavy metals (e.g. cadmium) in stabilizers and of volatile solvents in both stabilizers and printing inks has been held responsible for the loss of printability. Thus, there has arisen a need for a way to enhance the wettability of such present day PVC substrates.

A patent application by Witco Corporation published under the number WO96/15186 teaches that the wettability of heat-stabilized PVC film to water-based inks and the adherence of such inks to the film are improved by the incorporation of oxidized polyethylene in the PVC composition. The heat stabilizer is a mixture of barium and zinc carboxylates having up to 20 carbon atoms in combination with organic phosphites.

The surface tension of a heavy metal-containing PVC has been found to be from 25 to 33% higher than that of a traditionally plasticized PVC according to E. R. Napoleon in "Journal of Vinyl & Additive Technology", 3, No. 2, 145 (June 1997).

As taught in co-pending, commonly assigned patent application Ser. No. 09/133,605, filed Aug. 13, 1998, the teachings of which are incorporated herein by reference, the degradation products of a blocked or latent mercaptan present during processing of the halogen-containing resin at an elevated temperature enhance the activity of metal-based heat stabilizers such as organotin carboxylates and mercaptides in the composition. Vinyl chloride resin compositions and articles made thereof are stabilized particularly well by a combination of very low levels of zinc carboxylates and latent mercaptans selected from the group consisting of 2-S-(hydroxyalkylthio)-tetrahydropyran, 5-S-(hydroxyalkylthio)tetrahydrofuran, 6-S-(2formylhydroxyalkylthio)tetrahydropyran, the carboxylic acid esters of said alcohols, and mixtures of said alcohols and esters. Said latent mercaptans are also referred to as 2-S-(tetrahydropyranyl)-thioalkanol; 2-S-(tetrahydropyranyl)thioalkyl carboxylate; 6-S-(2-formyl-tetrahydropyranyl)thioalkanol and carboxylates thereof, and their furanyl homologs, i.e., 5-S-(tetrahydrofuranyl)thioalkanol, and 5-S-(tetrahydrofuranyl)-thioalkyl carboxylate.

SUMMARY OF THE INVENTION

It has now been found that a combination of such a latent mercaptan and a zinc salt of oxidized polyethylene is particularly valuable in that it imparts improved hydrophilicity to the surfaces of articles made from vinyl chloride resins as well as thermal stability during high temperature processing during fabrication of such articles. The zinc salt is the only metal-containing stabilizer present during the high temperature processing.

It is an object of this invention, therefore, to provide a heat stabilizer composition which is free from metals other than zinc and which also improves the wettability of vinyl chloride resins by water-based inks and paints.

It is another object of this invention to provide a heavy metal-free, heat stabilized halogen-containing resin having a surface tension which is amenable to coating with a water-based ink or paint.

It is a related object of this invention to provide heat stabilized flexible, semi-rigid, and rigid PVC resin articles which have improved receptivity to water-based inks and paints.

It is a related object of this invention to provide novel latent mercaptans which are useful, alone or in combination with other additives, in heat stabilizer compositions.

These and other objects of the invention which will become apparent from the following description are achieved by adding a heavy metal-free heat stabilizer comprising a latent mercaptan and a synergistic amount of a zinc salt of oxidized polyethylene as the sole metal-containing stabilizer to a vinyl chloride resin and processing the resulting composition at the incipient resin decomposition temperature whereupon a small but hydrophilically effective amount of oxidized polyethylene is split from the zinc salt by liberated hydrogen chloride and the latent mercaptan degrades to liberate a free mercaptan. Examples of the latent mercaptan include, without limitation, 2-S-(tetrahydropyranyl)-thioalkanol, a carboxylate thereof, a 2-S-(tetrahydropyranyl)-thiocarboxylic acid or ester thereof, furanyl homologs of each, and mixtures thereof.

For the purposes of this invention, the terms blocked mercaptan and latent mercaptan are used interchangeably to mean a thioether which degrades during processing of the composition at an elevated temperature to liberate a free mercaptan.

Other products of the degradation of the blocked mercaptan are believed to include carbocations of the blocking moiety which are stabilized by a molecular structure in which the electron deficiency is shared by several groups. Resonance stabilization and neighboring group stabilization are two of the possible mechanisms by which the carbocations may be stabilized. The carbocations act as intermediates in the formation of stable compounds early in the hot processing of halogen-containing polymers. Although such mechanisms and the resultant carbocations are believed to be an impetus for the liberation of the active free mercaptan, this invention is in no way limited by the foregoing attempt to explain the working of the invention. Those skilled in the art will see the resonance stabilization and neighboring group stabilization that are possible in the following structures of the blocked mercaptan; other mechanisms may be at work in other blocked mercaptans represented by these structures that also liberate an active free mercaptan upon thermal and/or chemical degradation during processing of polymeric compositions containing such blocked mercaptans.

DETAILED DESCRIPTION OF THE INVENTION

The vinyl chloride resins, also referred to hereinafter as PVC resins, are made from monomers consisting of vinyl chloride alone or a mixture of monomers comprising, preferably, at least about 70% by weight of vinyl chloride, based on the total monomer weight. Examples of the copolymers include those made from vinyl chloride and from about 1 to about 30% of a copolymerizable ethylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha-chloroacrylate, styrene, trichloroethylene, vinyl ketones such as vinyl methyl ketone and vinyl phenyl ketone, 1-fluoro-2-chloroethylene, acrylonitrile, chloroacrylonitrile, allylidene diacetate, chloroallylidene diacetate, and vinyl ethers such as vinyl ethyl ether, vinyl chloroethyl ether, vinyl phenyl ether, and the vinyl ether of ethoxytetrahydropyran prepared by the reaction of one mole of acrolein with one mole of ethylene glycol divinyl ether. Typical copolymers include vinyl chloride-vinyl acetate (96:4 sold commercially as VYNW), vinyl chloride-vinyl acetate (87:13), vinyl chloride-vinyl acetate-maleic anhydride (86:13:1), vinyl chloride-vinylidene chloride (95:5); vinyl chloride-diethyl fumarate (95:5), and vinyl chloride 2-ethylhexyl acrylate (80:20).

As used herein, the term PVC composition means a composition comprising a vinyl chloride resin. A rigid PVC composition is one which does not contain a plasticizer. A semi-rigid PVC composition is one which contains from 1 to about 25 parts of a plasticizer per 100 parts by weight of the vinyl chloride resin. A flexible PVC composition contains from about 25 to about 100 parts per 100 parts by weight (phr) of the vinyl chloride resin. Alkyl esters of carboxylic acids in which there are from 1 to 3 alkyl groups having from 8 to 12 carbon atoms are representative of the plasticizers. The alkyl group may be n-octyl, 2-ethylhexyl, nonyl, decyl, or dodecyl. Suitable esters include phthalates, trimellitates, benzoates, adipates, glutarates, and sebacates. The plasticizer may also be a pentaerythritol or such an ester thereof. A polymeric plasticizer is also suitable.

As used herein, an acyloxyalkyl radical originates from a carboxylic acid ester of an alkyl alcohol. Therefore, the $R^1$ radical of the stearic acid ester of mercaptopropanol, as represented by the formula below, is the stearoyloxypropyl radical; likewise, the $R^1$ radical of the oleic acid ester of mercaptopropanol, which is one of the tallate esters of that alcohol, is the oleoyloxypropyl radical.

As used herein, substantially means largely if not wholly that which is specified but so close that the difference is insignificant.

One of the advantages of this invention is that the offensive odor of mercaptans is masked by a blocking group so that the latent mercaptan thus created may be put into a PVC composition or the like with little or no offense to the operator with the knowledge that the free mercaptan will be released as a degradation product when the treated composition is heated during the usual processing, e.g. extrusion. It is believed that the free mercaptan is consumed as it is liberated in response to the evolution of hydrogen chloride at the incipient decomposition temperature of the vinyl chloride resin.

The blocking compounds are preferably those which are capable of furnishing a stabilized carbocation having a molecular structure in which the electron deficiency is shared by several groups. Resonance stabilization and neighboring group stabilization are two of the possible mechanisms by which the carbocations may be stabilized. Blocking compounds such as 3,4-dihyropyran and 2,3-dihydrofuran are preferred for the purposes of this invention.

The blocked mercaptans suitable for the purposes of this invention are represented by the following formula:

FORMULA 1

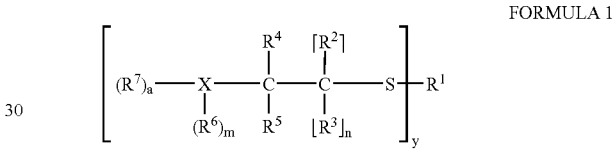

wherein a is 1, m is 0, and n is 0 or 1; y=1 to 4; $R^1$ is R'C(O)OH wherein R' is alkylene; or $R^1$ is an alkyl, pentaerythrityl, alkylene, cycloalkyl, cycloalkylene, aryl, alkaryl, aralkyl, aralkylene, hydroxyalkyl, dihydroxyalkyl, alkoxyalkyl, acyloxyalkyl, hydroxy(polyalkoxy)alkyl, hydroxy(polyalkoxy)carbonylalkyl, acyloxy(hydroxyalkyl), acyloxy(alkoxyalkyl), acyloxy(polyalkoxy)alkyl, acyloxy(polyalkoxy)carbonlalkyl, alkoxycarbonylalkyl, oxy[bis(alkoxycarbonylalkyl)], oxy[bis(polyalkoxycarbonylalkyl)], benzoyloxy(polyalkloxy)alkyl, benzoyloxy(polyalkoxy)carbonylakyl, alkylene bis-(acyloxyalkyl), thio-bis-[alkoxycarbonylalkyl], dithio-bis-[alkoxycarbonylalkyl], alkoxy(polyalkoxy)carbonylalkyl, hydroxyalkoxyalkyl, alkoxy(hydroxyalkyl), alkoxy(polyalkoxy)alkyl, mercaptoalkyl, mercaptoalkylene, mercaptoalkoxycarbonylalkyl, tetrahydropyranyloxy(polyalkoxy)carbonylalkyl, tetrahydropyranyloxyalkyl, hydroxyaryl, or mercaptoaryl radical, said alkyl, alkylene, alkoxy, and acyl radicals having from 1 to 22 carbon atoms; $R^2$, $R^3$, $R^4$, $R^5$, $R^6$, and $R^7$ are independently hydrogen, a hydroxyl, mercapto, alkyl, alkylene, acyl, aryl, haloaryl, alkaryl, aralkyl, hydroxyalkyl, alkenyloxyalkoxy, alkoxy, aryloxy, alkaryloxy, mercaptoalkyl, hydroxyalkylmercaptoalkyl, mercaptoalkylene, hydroxyaryl, alkoxyaryl, alkoxyhydroxyaryl, arylcarbonyl, or mercaptoaryl radical having from 1 to 2 carbon atoms; X is a heteroatom selected from the group consisting of oxygen and sulfur, and one or both of the $R^3$ and $R^5$ alkylene radicals joins with $R^7$ and X to form a heterocyclic moiety with X as the heteroatom.

The mercaptans useful in this invention include the well-known mercaptoalkanols and the carboxylate esters thereof, including, but not limited to, the following compounds:

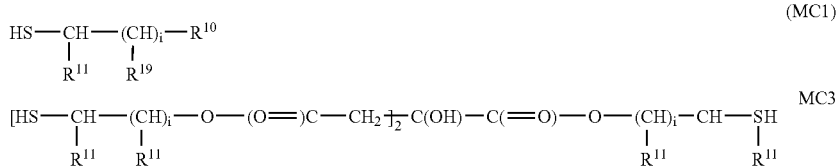

wherein $R^{10}$ and $R^{19}$ are independently OH, —O(C=O)$R^{17}$ —(C=O)O$R^{17}$, —SH, aryl, $C_1$ to $C_{18}$ alkyl, and —H;

$R^{11}$ is —H, aryl, or $C_1$ to $C_{18}$ alkyl;

$R^{17}$ is —H, alkyl, alkenyl, aryl, aralkyl, alkaryl, cycloalkyl, or cycloalkylenyl;

wherein i=0 or an integer from 1 to 6 inclusive.

Mercaptan-containing organic compounds preferred as intermediates in the preparation of the latent mercaptans of this invention are those compounds according to formula (MC1) where $R^{11}$ is —H, $R^{19}$ is —H, $R^{10}$ is —O(C=O)$R^{17}$ or —(C=O)O$R^{17}$, and i=1; and those compounds according to formula (MC3) where $R^{11}$ is —H and i=1.

Examples of mercaptan-containing compounds described by the above formulas include, but are not limited to, the following compounds:

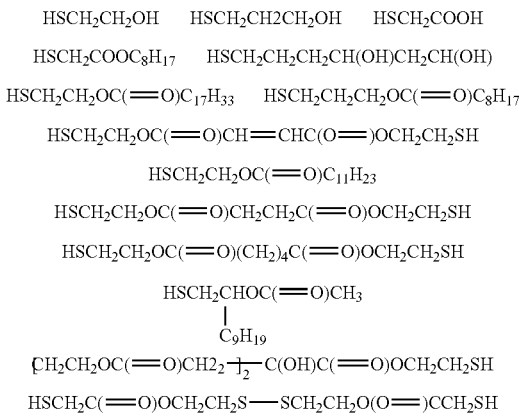

In general, the procedure for making the latent mercaptans which are useful in this invention comprises adding the mercapto group of the free mercaptan across the double bond of a polarized, unsaturated compound as follows:

To a stirred mixture, under nitrogen atmosphere, of the mercaptan, acid catalyst, and optionally, a small percentage of antioxidant to inhibit radical reactions, is added dropwise to the polarized, unsaturated compound, either neat or in solution, while maintaining the temperature between 10–70° C. The mixture or solution is then heated for between 1 and 6 hours at 35°–70° C. and conversion to product is monitored by gas chromatography and iodine titration for SH. The acid catalyst is removed by an alkaline wash and the resulting product is dried with magnesium sulfate and filtered. The solvent, if required, is removed under reduced pressure at <50° C. to yield the latent mercaptan. A solid phase catalyst may be used and then filtered out of the reaction mixture and regenerated for use in a subsequent synthesis, In this way, a wash step is eliminated. This generalized procedure is referred to hereinafter as Procedure A.

In accordance with Procedure A, for example, mercaptoethanol is added across the double bond of N-vinylcaprolactam to yield N-2-hydroxyethylthioethylcaprolactam. Mercaptoethyldecanoate (or mercaptoethylcaproate) reacts with 3,4-dihydropyran in that procedure to give 2-S-(tetrahydropyranyl)thioethyldecanoate. Bis(hydroxyethylthioethyl)cyclohexyl ether is made from the mercaptoethanol and cyclohexyl di-vinyl ether. In like manner, the corresponding caprate, oleate, and tallate esters form the corresponding cyclohexyl ethers. Also, indene is converted by the addition of the mercaptoethanol to 2H-dihydroindenylthioethanol.

A generalized procedure for the condensation of a free mercaptan with a labile halogen-containing compound is as follows:

To a stirred mixture of the mercaptan and halogen-containing compound under nitrogen atmosphere is added dropwise a solution of sodium methoxide in methanol while maintaining the temperature below 50° C. Optionally, the reaction is allowed to proceed without the addition of a base source and the liberated hydrogen chloride is removed by nitrogen gas sweep and neutralized with the use of an external acid scrubber. The mixture or solution is then heated for between 2 to 24 hours at 50°–70° C. and conversion to product is monitored by gas chromatography and iodine titration for % SH. The product is then neutralized, washed with water, dried with magnesium sulfate, and filtered. The solvent, if required, is removed under reduced pressure at <50° C. to yield the latent mercaptan. This generalized procedure is referred to hereinafter as Procedure B.

A generalized procedure for the condensation of a free mercaptan with a labile hydroxyl-containing compound is as follows:

To a stirred solution of the mercaptan, acid catalyst, and solvent under nitrogen atmosphere is added the hydroxy-containing compound either neat or in solution while maintaining the temperature <45° C. The solution is then heated to 45°–75° C. for between 1 to 10 hours and conversion to product is monitored by gas chromatography and iodine titration for % SH. Optionally, an azeotropic solvent is chosen for removal of reaction water by an appropriate means at reflux temperatures, typically 60°–120° C. Completion of reaction is achieved after the theory amount of water has been collected. The acid catalyst is removed by alkaline wash and the resulting solution is dried with magnesium sulfate and filtered. The solvent is removed under reduced pressure at <55° C. to yield the latent mercaptan. This procedure is referred to hereinafter as Procedure C.

For example, 2-hydroxybenzyl alcohol condenses with mercaptoethanol in accordance with Procedure C to form 1-(2-hydroxyphenyl)-1-S-(2-hydroxyethylthio)methane.

A generalized procedure for the reaction of a free mercaptan with a glycidyl ether is as follows:

To a stirred mixture of the mercaptan and acid catalyst under nitrogen atmosphere is added the glycidyl ether, either neat or in solution, while maintaining the temperature between 25°–60° C. The mixture or solution is then heated to between 50°–75° C. for a period of 1 to 6 hours and conversion to product is monitored by gas chromatography and iodine titration for % SH. The acid catalyst is removed by alkaline wash, the resulting product is dried with magnesium sulfate, and filtered. The solvent, if required, is removed under reduced pressure at <55° C. to yield the latent mercaptan. For example, the reaction between mercaptoethanol and glycidyl neodecanoate gives $C_9H_{19}C(=O)OCH_2CH(OH)CH_2SCH_2CH_2OH$. This procedure is referred to hereinafter as Procedure D.

A generalized procedure for the condensation of a free mercaptan with an aldehyde is as follows:

To a stirred solution of the mercaptan, acid catalyst, and azeotropic solvent under nitrogen atmosphere is added the aldehyde with heating to reflux, typically between 65°–120° C., for removal of reaction water. Completion of reaction is achieved after the theory amount of water has been collected. Optionally, to a stirred solution of mercaptan, aldehyde, and ether is added $BF_3$-etherate dropwise under reflux conditions. The solution is refluxed for between 1 to 6 hours and conversion to product is monitored by gas chromatography. The acid catalyst is removed by alkaline wash, the solution is dried with magnesium sulfate and filtered. The solvent is removed under reduced pressure at <65°C. to yield the latent mercaptan. This generalized procedure is referred to hereinafter as Procedure E.

The polarized, unsaturated compounds are exemplified by 3,4-dihydropyran; 3,4-dihydro-2-methoxy-2H-pyran; 3,4-dihydro-2ethoxy-2H-pyran; 3,4-dihydro-2-methoxy-2H-pyran; 3,4-dihydro-2formyl-2H-pyran; 3,4-dihydro-3-methoxy-2H-pyran; and 2,3-dihydrofuran. The 3,4-dihydro-2-formyl-2H-pyran is made by the Diels-Alder dimerization of acrolein at high temperatures and pressures. The 3,4-dihydro-2-alkoxy-2H-pyrans and 3,4-dihydro-2phenoxy-2H-pyran are made by the reaction of the corresponding vinyl ether with acrolein in the presence of a catalytic amount of a zinc salt, e.g., zinc chloride. A variety of 3,4-dihydro-2H-pyrans having a substituent in the 2-position can be made by similar reactions. The products formed by the reaction of 1 and 2 moles of acrolein with the divinyl ether of an alkylene-or polyalkylene glycol are blocking agents, also. In the case of the reaction of two moles of acrolein per mole of a divinyl ether, latent mercaptans made from the resulting di-(3,4-dihydropyranyl)ethers also have the potential of being chelating agents in the polymer compositions of this invention. The reaction of one mole of acrolein with one mole of the divinyl ether forms a monomer which may be copolymerized with vinyl chloride with or without a wide variety of ethylenically unsaturated compounds. The product from the reaction of acrolein with chloroethyl vinyl ether provides a substituted 3,4-dihydropyran that can be further derivatized.

A stabilizer composition of this invention may be made quite conveniently by the addition of a mercaptan across the double bond of the pyran ring in the presence of zinc chloride as a catalyst for the addition and as a synergistic stabilizer in the product.

Examples of 2-S-(tetrahydropyranyl)thioalkanols that are suitable as latent mercaptans for this invention include, without limitation, 2-S-(tetrahydropyranyl)thioethanol, 2-S-(tetrahydropyranyl)thiopropanol, and 2-S-(tetrahydropyranyl)-thiobutanol 6-S-(2-formyl-tetrahydropyranyl)thioethanol, and their furanyl homologs, e.g., 5-S-(tetrahydrofuranyl)thioalkanol. The carboxylates suitable for the purposes of this invention are exemplified by 2-S-(tetrahydropyranyl)thioethyl caprate, which also may be named 2-S-(2-decanoyloxyethylthio)tetrahydropyran, made by the reaction between mercaptoethyl caprate and 3,4-dihydropyran according to the foregoing procedure and has the following formula:

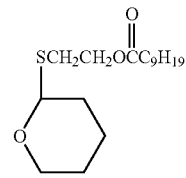

Homologs of the thus described compounds which are particularly useful in. the stabilization of flexible PVC compositions include the 2-S-(tetrahydropyranyl)thioalkyl carboxylates and their furanyl homologs wherein the ethyl moiety is replaced by propyl, butyl, hexyl, and others in the series up to and including dodecyl and the capric acid radical of said compound is replaced by other fatty acid radicals (saturated and unsaturated) or resin acid radicals having up to and including 22 carbon atoms. The acids are exemplified by caproic, caprylic, lauric, myristic, palmitic, stearic, arachidic, behenic, and the oleic and linoleic acids, as such, or as found in tall oil acids along with abietic and pimaric acids. The mercaptoalkyl carboxylate moiety is thus exemplified by mercaptoethyl laurate, mercaptoethyl oleate, mercaptoethyl hexanoate, mercaptoethyl octanoate, mercaptoethyl myristate, mercaptoethyl palmitate, mercaptoethyl stearate, mercaptoethyl oleate, mercaptoethyl linoleate, and the mercaptopropyl, mercaptobutyl, and mercaptooctyl homologs of each of the above. The esters are made by the conventional method of reacting the hydroxyl group of a mercaptoalkanol with the desired carboxylic acid in the presence of an acidic catalyst and removing water as it forms.

When 2-S-tetrahydopyranylthioethanol is prepared from 3,4-dihydropyran by said procedure, by-products having the following formulas are also obtained:

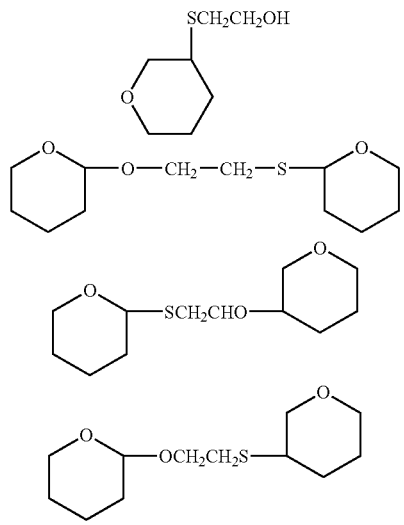

-continued

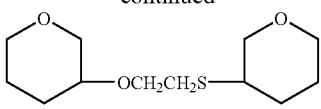

The homologous by-products are expected when 2,3-dihydrofuran is reacted with mercaptoethanol but the principal product is the 5-S-tetrahydrofuranylthioethanol shown by the following structure:

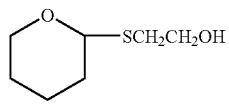

When the 3,4-dihydropyran is replaced by a 3,4-dihydro-2-alkoxy-pyran; a 3,4-dihydro-2-phenoxy-pyran; or a 3,4-dihydro-2-formyl-pyran in the above procedure, the following products are formed:

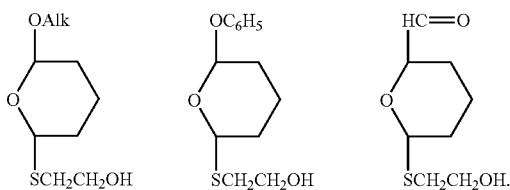

A 2-S-(tetrahydropyranyl)mercaptoalkyl carboxylate is more active as a heat stabilizer in flexible PVC compositions than the tetrahydropyranyl-blocked mercaptans derived from alkylmercaptans such as dodecanethiol when activated according to this invention as manifest in the improved color hold properties and dynamic thermal stability of such stabilized PVC compositions. The higher activity may be the result of the better compatibility of the ester-containing latent mercaptans with a plasticized PVC. The compatibility of the corresponding homologous furan-based latent mercaptans is similar.

As used herein, a zinc ionomer is defined as a salt in which both of the zinc valences are paired with carboxylate anions from the oxidized polyethylene, a mixed salt in which one of the zinc valences is paired with a carboxylate ion having from 7 to 18 carbon atoms and the other is paired with a carboxylate ion from an oxidized polyethylene, or a physical mixture of a zinc salt of a carboxylic acid having from 7 to 18 carbon atoms and a zinc salt an oxidized polyethylene. For the purposes of this invention, the oxidized polyethylene has a molecular weight of at least about 750 and up to about 2100. The oxidized polyethylenes have from about 50 to about 150 carbon atoms and are believed to have hydroxyl and ketonic substituents along the polymer chain as well as carboxylic groups. The acid number ranges from about 2 to about 50. The melting point of the oxidized polyethylene is preferably from about 60° C. to 150° C. (140–302° F.) so that it is solid at the temperatures at which vinyl chloride resins are normally used. A preferred oxidized polyethylene, sold by Allied-Signal Corp. as AC629A, has molecular weight of about 2000, a softening point in the 213–221° F. (101–105° C.) range, and an acid number of 14–17.

The carboxylic acids that are useful along with the oxidized polyethylene may be aliphatic, arylaliphatic, aromatic, or alkylaromatic; the aliphatic moieties have a straight or branched chain structure and may be saturated or unsaturated. Thus, the mixed salt may include an anion from, for example, heptanoic, octanoic (or caprylic), 2-ethylhexanoic, decanoic (or capric), lauric, oleic, stearic, benzoic, phenylacetic, or methylbenzoic acid. An ionomer wherein the octanoate and the oxidized polyethylene fulfill the zinc valences is an example of a preferred latent wetting agent for the vinyl chloride resin.

The stoichiometric amount of zinc oxide, zinc chloride, or a zinc carboxylate/chloride is reacted with the oxidized polyethylene to prepare the desired zinc salt. The zinc carboxylate/chloride is prepared from zinc chloride and less than the stoichiometric amount of the desired carboxylic acid so that the remaining chloride ions may react with the oxidized polyethylene to form a mixed salt as an ionomer useful in this invention. An ionomer is also made by the stepwise reaction of the zinc oxide with the oxidized polyethylene and, for example, octanoic acid or by a one step reaction with a mixture of the oxidized polyethylene and octanoic acid.

The adhesion promoting stabilizer compositions of this invention consist essentially of from about 40% to about 98%, preferably from about 60% to about 80% of a latent mercaptan and from about 2 to about 60%, preferably from about 20 to about 40%, of the zinc ionomer, based on the total weight of the stabilizer composition. The latent mercaptan is exemplified by 2-S-(tetrahydropyranyl)thioalkanol, a carboxylate thereof, a 2-S-(tetrahydrofuranyl)-thioalkanol, a carboxylate thereof, a 2-S-(tetrahydropyranyl) thiocarboxylic acid, an ester thereof, a 2-S-(tetrahydrofuranyl)thiocarboxylic acid, an ester thereof, and a mixture of two or more of said alkanols, acids, and esters. They are particularly suited to impart superior stabilization against the deteriorative effects of heat and ultra-violet light on flexible PVC resins in comparison with stabilizer compositions previously known in the art. They may be prepared by blending the components thereof in any convenient manner which produces a homogeneous mixture, such as by shaking or stirring in a container. Likewise, the stabilizer compositions of this invention can be incorporated in a vinyl chloride resin in an appropriate mill or mixer or by any other of the well-known methods which provide uniform distribution of the stabilizer throughout the polymer composition.

It will be readily apparent to one of ordinary skill in the art, that the precise amount of stabilizer composition added to the vinyl chloride resin will depend upon several factors, including, but not limited to, the particular resin employed, the temperature to which the resin will be subjected, and the possible presence of other stabilizing compounds. In general, the more severe the conditions to which the resin is subjected, and the longer the term required for resisting degradation, the greater will be the amount of stabilizer composition required. Generally, the stabilizer composition is used in an amount to provide as little as about 0.20 part and as much as about 5 parts by weight of the latent mercaptan per hundred parts by weight (phr) of the PVC resin. While there is no critical upper limit to the amount of latent mercaptan which can be employed, amounts up to about 3.0 phr of the PVC resin are preferred. The zinc salt of oxidized polyethylene is used in an amount effective to improve the wettability to water-based paints and inks of an article formed from the vinyl chloride resin. From about 0.2 to about 2.5 phr is suitable, but from 0.5–1.5 phr is preferable.

In addition to the stabilizer compositions of this invention, the PVC resin compositions of this invention may contain plasticizers, as mentioned above in regard to semi-rigid and flexible PVC, as well as pigments, fillers, antioxidants, blowing agents, dyes, ultraviolet light absorbing agents, densifying agents, biocides, and the like.

Conventional non-metallic stabilizers can also be included in the PVC resin compositions of the present invention. Thus, there can be included 0.01–0.75%, based on the weight of the resin, of sulfur containing compounds such as dilaurylthiodipropionate, distearyl 3,3'-thiodipropionate, dicyclohexyl-3,3-thiodipropionate, dioleyl-3,3'-thiodipropionate, dibenzyl-3,3'-thiodipropionate, didecyl-3,3'-thiodipropionate, dibenzyl-3,3'-thiodipropionate, diethyl-3,3'-thiopropionate, lauryl ester of 3-methylmercaptopropionic acid, lauryl ester of 3-butylmercaptopropionic acid, lauryl ester of 3-lauryl mercaptopropionic acid, and phenyl ester of 3-octyl mercaptopropionic acid.

Likewise there can be included from 0.01–10% by weight of the vinyl chloride polymer of a polyol stabilizer for vinyl chloride resins. Thus there can be included glycerol, sorbitol, pentaerythritol, mannitol and polyethers such as diethylene glycol, triethylene glycol, tetraethylene glycol, tripropylene glycol, and the like.

Nitrogen containing stabilizers such as dicyandiamide, melamine, urea, formoguanamine, dimethyl hydantoin, guanidine, thio-urea, 2-phenylindoles, aminocrotonates, N-substituted maleimides, uracil, the 1,3-dialkyl-6-aminouracil derivatives described in German Offenlegungsschrift 19,741,778 by Ciba Specialty Chemicals Holding Inc., and the pyrrolodiazine diones described in published Australian Patent Application No. AU-A-48232/96 by Ciba-Geigy, and the like may also be included in the compositions of this invention in amounts of 0.1–10% by weight.

The 1,3-dialkyl-6-amino-uracils and 1,3-dialkyl-6-phenylamino uracils are prepared by known methods such as those taught in U.S. Pat. No. 2,598,936, which is incorporated herein by reference. Other uracils suitable for use in this invention have substituents such as hydroxyalkyl, alkoxyalkyl, hydroxyphenyl, etc. and are taught in U.S. Pat. No. 4,656,209, which is incorporated herein by reference, also. They, also, may be made according to the procedures of the '936 patent. Their structure is illustrated by the following formula:

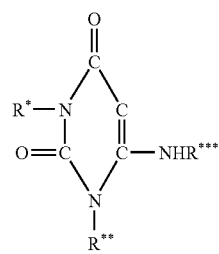

wherein R*, and R, are independently hydrogen, alkyl, hydroxyalkyl, or alkoxyalkyl, and R* is hydrogen, alkyl, phenyl, or hydroxyphenyl, wherein each of the alkyl moieties have from 1 to 4 carbon atoms.

Of particular interest are the pyrrolodiazine diones described by the formula:

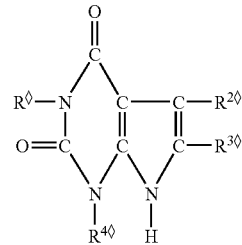

wherein $R^\diamond$, $R^{2\diamond}$, $R^{3\diamond}$, and $R^{4\diamond}$ are independently hydrogen or $C_1$–$C_4$ alkyl. Examples of compounds contemplated for use in this invention include the 1H-pyrrolo[2,3-d]pyrimidine-2,4(3H, 7H)-diones exemplified by Compound Nos. 103, 111, 123, 129, and 131 of said Australian Patent Application, which have the following substituents:

No. 103 1,3,6-trimethyl;
No. 111 1,3,6,7-tetramethyl;
No. 123 none;
No. 129 1,3-diethyl, 6-methyl;
No. 131 1,3-di-n-butyl, 6-methyl;

Said compounds may be prepared by the method described by S. Senda and K. Hirota, Chem. Pharm. Bull., 22(7), 1459–1467(1974) or by the reaction of the corresponding aminouracil with molar excesses of chloroacetaldehyde and ammonium acetate in water at about 65° C. until a precipitate forms or with molar excesses of acetoxyacetone and ammonium acetate in water at reflux for 12 hours.

An anti-oxidant may be added in an amount of 0.01–10%, preferably 0.1–5% by weight of the PVC resin. Phenolic anti-oxidants are particularly suitable and are exemplified by 2,6-di-t-butyl-p-cresol, butylated hydroxyanisole, propyl gallate, 4,4'-thiobis(6-t-butyl-m-cresol), 4,4'-cyclohexylidene diphenol, 2,5-di-t-amyl hydroquinone, 4,4'-butylidene bis(6-t-butyl-m-cresol), hydroquinone monobenzyl ether, 2,2'-methylene-bis(4-methyl-6-t-butyl phenol), 2,6-butyl-4-decyloxy phenol, 2-t-butyl-4-dodecyloxy phenol, 2-t-butyl-4-dodecyloxy phenol, 2-t-butyl-4-octadecyloxy phenol, 4,4'-methylene-bis(2,6-di-t-butyl phenol), p-amino phenol, N-lauryloxy-p-amino phenol, 4,4'-thiobis(3-methyl-6-t-butyl phenol), bis[o-(1,1,3,3-tetramethyl butyl)phenol] sulfide, 4-acetyl-β-resorcylic acid, A-stage p-t-butylphenol-formaldehyde resin, 4-dodecyloxy-2-hydroxybenzophenone, 3-hydroxy-4-(phenylcarbonyl) phenyl palmitate, n-dodecyl ester of 3-hydroxy-4-(phenyl carbonyl)phenoxyacetic acid, and t-butyl phenol.

From 0.01–30% by weight of an epoxy compound, based on the weight of the vinyl chloride polymer in the PVC cornpositions of this invention may also be used. Examples of such epoxy compounds include epoxidized soya bean oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrin/bis-phenol A resins, phenoxy-propylene oxide, butoxypropylene oxide, epoxidized neopentylene oleate, glycidyl epoxystearate, epoxidized α-olefins, epoxidized glycidyl soyate, dicyclopentadiene dioxide, epoxidized butyl toluate, styrene oxide, dipentene dioxide, glycidol, vinyl cyclo-hexene dioxide, glycidyl ether of resorcinol, glycidol ether of hydroquinone, glycidyl ether of 1,5-dihyroxynaphthalene, epoxidized linseed oil fatty acids, allyl glycidyl ether, butyl glycidyl ether, cyclohexane oxide, 4-(2,3-epoxypropoxy)aceto-phenone, mesityl oxide epoxide, 2-ethyl-3-propyl glycidamide, glycidyl ethers of glycerine, pentaerythritol and sorbitol, and 3,4-epoxycyclohexane-1,1-dimethanol bis-9,10-epoxystearate.

Likewise there can be used organic phosphites in an amount of 0.01 to 10%, preferably 0.1–5% by weight of the vinyl chloride polymer. The organic phosphites contain one or more, up to a total of three, aryl, alkyl, aralkyl and alkaryl groups, in any combination. The term "trialkylaryl" is inclusive of alkyl, aryl, alkaryl and aralkyl phosphites containing any assortment of alkyl, aryl, alkaryl and aralkyl groups. Exemplary are triphenyl phosphite, tricresyl phosphite, tri(dimethylphenyl)phosphite, tributyl phosphite, trioctyl phosphate, tridodecyl phosphite, octyl diphenyl phosphite, dioctyl phenyl phosphite, tri(octyl-phenyl)phosphite, tri(nonylphenyl)phosphite, tribenzyl phosphite, butyl dicresyl phosphite, octyl di(octyl-phenyl)phosphite, tri(2-ethylhexyl)phosphite, tritolyl phosphite, tri(2-cyclohexylphenyl)phosphite, tri-alpha-naphthyl phosphite, tri(phenylphenyl)phosphite, and tri(2-phenylethyl)phosphite.

Conventional lubricants for vinyl chloride resins such as low molecular weight polyethylene, i.e. polyethylene wax, fatty acid amides, e.g. lauramide and stearamide, bisamides, e.g. decamethylene bis amide, and fatty acid esters, e.g. butyl stearate, glyceryl stearate, linseed oil, palm oil, decyloleate, corn oil, cottonseed oil, hydrogenated cottonseed oil, stearic acid, calcium stearate, mineral oil, montan wax, and the like can also be included.

The latent mercaptans having the following formula (Formula 2 are considered to be novel compositions of matter that are useful with or without the zinc ionomers as a heat-stabilizer for halogen-containing polymers

FORMULA 2

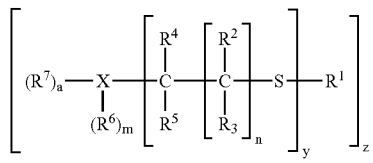

wherein a is 0 or 1, m is 0 or 1, and n is 0 or 1; y=1 to 4, when y=1, z is 1 to 4, when y is more than 1 z is 1; $R^1$ is R'C(O)OH wherein R' is an alkylene radical; or $R^1$ is a thio-[bis(alkoxycarbonylalkyl)], dithio-bis[(alkoxycarbonylalkyl)], pentaerythrityl, alkenyloxy(polyalkoxy)alkyl, oxy[bis(alkoxyacyl)], oxy[bis(polyalkoxycarbonylalkyl)], benzoyloxy(polyalkoxy)alkyl, or benzoyloxy(polyalkoxy) carbonylalkyl radical, said alkyl, alkylene, and acyl radicals having from 1 to 22 carbon atoms; $R^2$, $R^3$, $R^4$, $R^5$, $R^6$, and $R^7$ are independently hydrogen, a hydroxyl, mercapto, alkyl, alkytenyl, acyl, aryl, haloaryl, alkaryl, aralkyl, hydroxyalkyl, chloroalkoxy, alkylene, alkenyloxyalkoxy, alkoxy, aryloxy, alkaryloxy, mercaptoalkyl, hydroxyalkylmercaptoalkyl, mercaptoalkylenyl, hydroxyaryl, alkoxyaryl, alkoxyhydroxyaryl, arylcarbonyl, or mercaptoaryl radical having from 1 to 22 carbon atoms; X is aryl, haloaryl, alkaryl, hydroxyaryl, dihydroxyaryl, aralkaryl, alkoxyaryl, arylcycloalkyl, or a heteroatom selected from the group consisting of oxygen and sulfur, with the option that one or both of the $R^3$ and $R^5$ alkylenyl radicals joins with $R^7$ and X to form a heterocyclic moiety with X as the heteroatom.

It has also been found that a one-component PVC stabilizer is obtained from the latent mercaptans of Formula 1 and Formula 2 wherein $R^1$ is pentaerythrityl by forming a complex with a zinc halide. For example, a zinc halide forms a complex with a pair of neighboring hydroxyl groups in a latent mercaptan such as the adduct of 2 moles of 3,4-dihydropyran with one mole of the diester of pentaerythritol and a mercaptocarboxylic acid such as thioglycolic acid or mercaptopropionic acid. The one-component PVC stabilizer is pre-formed or formed in situ by complexing a zinc halide, preferably the chloride, with such a latent mercaptan as shown by the following formula:

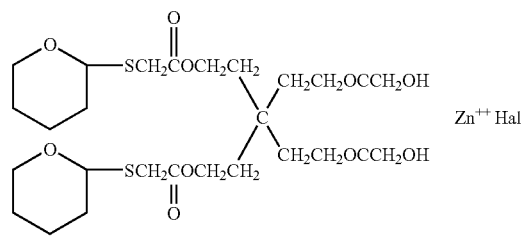

wherein Hal is a halogen ion, preferably a chloride ion.

The preparation of blocked mercaptans and zinc salts used in the adhesion promoting stabilizers of this invention, the preparation of said stabilizers, and the advantages of compositions comprising said stabilizers are illustrated as follows.

Preparation of
2-S-(tetrahydropyranyl)thioethylcaprate $^1$H-NMR spectroscopy was used to determine the molecular structure of 2-S-(decanoyloxyethylthio)tetrahydropyran or 2-S(tetrahydropyranyl)thioethylcaprate which was prepared by adding 42.0 grams (0.50 mole) of 3,4-dihydropyran to 112.2 grams (0.50 equivalent) of mercaptoethylcaprate (14.7% SH) in the presence of an acid catalyst over a period of 45 minutes while maintaining a nitrogen atmosphere and a temperature below 35° C. and then heating it to 50° C. and holding that temperature for 1.5 hours. After cooling the solution, it was washed with two 200 ml portions of a 10% sodium bicarbonate solution in water, followed by a 200 ml wash with water. The organic layer was dried with $MgSO_4$ to yield a light yellow liquid having an SH content of less than 0.5 percent as determined by titration with a 0.100 N iodine solution in isopropanol. The $^1$H-NMR (CDCl$_3$, δ) spectrum was: 2.3 (2H, t, —C(═O)—C$\underline{H}_2$—CH$_2$), 2.8 (2H, m, —S—C$\underline{H}_2$—CH$_2$—), 4.2 (2H, m, —S—CH$_2$C$\underline{H}_2$—O—), 4.9 (1H, m, —O—C$\underline{H}$(—S—CH$_2$—)—CH$_2$—CH$_2$—). The total color change (dE) of a PVC composition containing 0.13 phr of the latent mercaptan of this example was measured versus a white tile standard using a Hunter colorimeter at one minute intervals. At one minute, it was 4.2; at five minutes, it was 8.4.

Preparation of 2-S-tetrahvdropyranyl)thioethyltallate

2-S-tetrahydropyranyl)thioethyltallate was prepared by adding 172.45 grams (2.05 equiv.) of 3,4-dihydro(2H)pyran dropwise to 760.00 grams (2.00 equiv.) of 2-mercaptoethyltallate (8.70% SH by iodometric titration) containing 0.93 gram of methanesulfonic acid (70% active) over a period of 45 minutes under a nitrogen blanket and a temperature between 25–35° C. and heating to 35–40° C. for 2 hours. After cooling the solution, 3 grams of Norite carbon black was charged and the product was vacuum filtered to yield 932 grams of yellow liquid having a SH content of less than 0.4% as determined by titration with 0.100 N iodine solution in isopropanol. The $^1$H-NMR(CDC13, δ) spectrum was: 2.3 (2H, t, —C(=O)—CH$_2$—CH$_2$—), 2.8 (2H, m, —S—CH$_2$—CH$_2$—), 4.3 (2H, m, (—CC(=O)—O—CH$_2$), 4.9 (1H, m, —O—CH(—S—CH$_2$)—CH$_2$—CH$_2$—). GC of the product (1% in ether) indicated one primary product peak at 26.3 minutes retention time (50–300° C.; 10° C./min.; split flow injector/FID). The. product is referred to in Table 1 below as DHP/2-MET.

Preparation of a Zinc Ionomer

To a 250 ml flask fitted with a side-arm condenser there was charged with stirring 50 grams (0.0143 equivalent) of oxidized polyethylene (Allied Signal AC-629A), 175 ml of butyl carbitol, 1.16 grams (0.0286 equivalent) of 99% pure zinc oxide, and 2.06 grams (0.0143 equivalent) of 99% pure octanoic acid. The reaction mixture was then heated to 75° C. (167° F.) and 3 drops of glacial acetic acid were added before the temperature was raised to 120–125° C. (248–257° F.) for 20 minutes. The mixture was stripped of water and solvent by applying a vacuum of 3 mm Hg at that temperature. The product is a cream-colored wax which has a zinc content of 1.8% (measured as the metal) according to atomic absorption analysis. The theoretical zinc content is 1.8%. The product is referred below as ZNION.

b) for comparison in Table II. The dynamic thermal stability (DTS) of the compositions was measured on a Brabender Plasti-Corder PL-2100 rheometer at 200° C./80 rpm with No. 6 roller blades and an electric head. The DTS, shown in Table 3, was recorded as the elapsed time in minutes before a sharp upturn in the torque curve during processing was observed. The DTS value is considered to be the time at which degradation of the PVC began.

TABLE 1

| Example | Stabilizer | Amount (phr) |
|---|---|---|
| 2 | ZNPM#1 | 2.5 |
| 3 | DHP/2-MET | 2.0 |
|  | and ZNION | 0.5 |
|  | added separately |  |
| Control #1 | DHP/2-MET | 2.5 |
| Control #2 | ZNION | 0.5 |
| Comp Ex 1 | AKZO INTERSTAB CZ-11 | 2.5 |
| Comp Ex 2 | FERRO THERM-CHEK 760X | 2.5 |

TABLE 2

PVC Color Hold (Yellowness Index) Minutes

| Time\Ex. | 5 | 10 | 15 | 20 | 25 | 30 | 35 | 40 | 45 | 50 | 55 | 60 |
|---|---|---|---|---|---|---|---|---|---|---|---|---|
| 2 | 11.6 | 13.9 | 17.1 | 19.3 | 20.0 | 23.1 | 26.0 | 30.9 | 33.1 | 36.3 | 41.6 | 49.6 |
| 3 | 11.5 | 12.8 | 13.4 | 15.4 | 16.6 | 17.8 | 22.3 | 27.0 | 31.5 | 35.9 | 44.4 | 52.6 |
| Con 1 | 46.5 | 78.7 | 87.8 | 89.9 | 88.6 | 91.8 | 99.1 | 101.9 | 106.7 | 105.2 | 113.5 | 112.1 |
| Con 2 | 21.8 | 27.2 | 35.6 | 45:0 | 59.2 | 60.9 | 84.7 | burn | — | — | — | — |
| CE 1 | 13.4 | 19.7 | 25.3 | 33.2 | 37.7 | 66.9 | 74.7 | burn | — | — | — | — |
| CE 2 | 13.5 | 16.2 | 21.3 | 27.9 | 38.6 | burn | — | — | — | — | — | — |

EXAMPLE 1

A mixture of 5.2 grams of the above zinc ionomer and 20.8 grams of 2-S-tetrahydropyranyl-thioethyl tallate was heated in a 50 ml Erlenmeyer flask to 85° C. to obtain a homogeneous dispersion. When cooled, the product is a soft paste having a zinc content of 0.4% as the metal. The product is referred to in Table below as ZNPM#1.

EXAMPLE 2

A general flexible PVC composition containing:

| INGREDIENT | AMOUNT |
|---|---|
| PVC resin (k = 70) | 100.0 parts |
| Dioctyl phthalate | 40.0 phr |
| Epoxidized soybean oil | 5.0 phr |
| Stearic acid | 0.2 phr |
| Stabilizer | See Table 1 | was processed on a dynamic two-roll mill (roll speeds 30R/40R) at 350° F. with chips taken at five minute intervals to a maximum of 60 minutes. The yellowness index of the chips was measured using a Hunter Labs Colorimeter (L, a,

TABLE 3

Dynamic Thermal Stability

| Example | Time/minutes |
|---|---|
| 2 | 45.9 |
| 3 | 44.6 |
| Con 1 | 55.1 |
| Con 2 | 14.0 |
| CE 1 | 25.7 |
| CE 2 | 12.6 |

EXAMPLE 4

A general flexible PVC formulation containing:

| INGREDIENT | AMOUNT |
|---|---|
| PVC resin (k = 70) | 100.0 parts |
| Dioctyl phthalate | 40.0 phr |
| Epoxidized soybean oil | 5.0 phr |
| Stearic acid | 0.2 phr |
| Stabilizer | See Table 4 | was processed on a dynamic two-roll mill at 350° F. to give a series of 45 mil thick sheets. A drop of a material having a known surface tension was placed on each sheet and the advancing contact angle of each drop was quantified with a goniometer at 24° C. The cosine of the contact angle was plotted against the surface tension of each drop. The line was extrapolated to cosine=1 (critical surface tension). The results are given in Table 5 where Sheets A–E were made from the formulations shown in Table 4.

TABLE 4

| Example | Stabilizer | Amount (phr) | % metal |
|---|---|---|---|
| Comp Ex 3 | DHP/2-MET | 2.00 | 0.0 |
| Sheet A | Zinc octanoate (18% Zn) | 0.05 | 0.5 |
| Example 5 | DHP/2-MET | 2.00 | |
| Sheet B | ZNION | 0.75 | 0.5 |
| Comp Ex 4 | Calcium stearate | 2.00 | 6.5 |
| Sheet C | Zinc octanoate (18% Zn) | 0.05 | 0.5 |
| Comp Ex 5 Sheet D | Commercial Ba/Zn/P | 2.00 | 9.0 |
| Comp Ex 6 Sheet E | Commercial Ca/Zn | 2.00 | 3.0 |

TABLE 5

| PVC Sheet | Surface tension (±0.5 dyne-cm) |
|---|---|
| A | 22.0 |
| B | 25.6 |
| C | 22.0 |
| D | 21.3 |
| E | 21.2 |

It can be seen that the stabilizer/adhesion promoter of this invention imparts an increase in the surface tension to the vinyl sheets. This 20% increase in hydrophilicity makes the vinyl sheets more amenable to coating with water-based inks.

The following examples show the utility in this invention of latent mercaptans of Formula 1 wherein $R^1$ is a radical from an ester of a glycol.

EXAMPLE 6

Preparation of Intermediate

A mixture of 736.16 grams (8 moles) of thioglycolic acid, 848.96 grams (8 moles) of diethyleneglycol, and 1.3 grams of p-toluene sulfonic acid was heated to 80° C. at a pressure of 400 Torr in a reactor equipped with a mechanical stirrer, a thermometer, and a vacuum take-off condenser. The refluxing temperature was held for 1 hour before the pressure was reduced to 120 Torr over a period of 2.5 hours to remove water formed by the esterification. The temperature rose to 120° C.as the pressure was further reduced to 20 Torr over a period of 0.5 hour. The total weight of water removed was 140.92 grams. The product has an acid value of 12 and an SH content of 16.75% by weight. The yield was 1421.12 grams. The product was a mixture of the diethyleneglycol mono- and diesters of thioglycolic acid (i.e., hydroxyethyloxyethylmercaptoacetate and ethyloxyethyl di-mercaptoacetate) and was satisfactory.

Preparation of Adduct

To the 1421 grams (7.89 equivalents) of intermediate thus produced there was added 6.38 grams of AMBERLYST 15 ion exchange resin and then 708.21 grams (8.42 equivalents) of 3,4-dihydro(2H)pyran (DHP) was added dropwise over a period of 135 minutes under a nitrogen blanket at a temperature 40–50° C. After continued heating at 40–50° C. for 2.25 hours, the %SH was 5.36. Another charge of DHP weighing 300.21 grams (about 3.5 moles) was added during a period of 0.5 hour and the reaction mixture was held at about 55° C. for 0.5 hour to reduce the % SH to 3,32. After standing overnight (about 14 hours) under nitrogen, the product had an SH content of 2.68%.

The product was a mixture containing 2-S-(tetrahydropyranyl)hydroxyethoxyoxyethylthioglycolate, wherein $R^1$ is hydroxyethoxyethoxyacetylmethyl, and bis-[2-S-(tetrahydropyranyl)ethoxyethyl]thioglycolate, wherein $R^1$ is oxy[bis (ethoxyacetylmethyl)] and y is 2.

Preparation of Stabilizer

Said adduct and the zinc ionomer (or ZNION)described above are mixed to form an adhesion promoting stabilizer of this invention.

EXAMPLE 7

Preparation of Intermediate

A mixture of 98.23 grams (1.07 moles) of thioglycolic acid, 160.06 grams (1.07 moles) of triethyleneglycol, and 0.2 gram of p-toluene sulfonic acid was heated to 100° C. at a pressure of 250 Torr in a reactor equipped with a mechanical stirrer, a thermometer, and a vacuum take-off condenser. The refluxing temperature was held for 25 minutes before the pressure was reduced to 10 Torr over a period of 1.5 hours to remove water formed by the esterification. The product contained the triethyleneglycol monoester (about 57% of the total weight) and the triethyleneglycol diester of thioglycolic acid (about 20%) and was satisfactory.

Preparation of Adduct

A mixture containing (2-S-tetrahydropyranyl)hydroxyethoxy-ethoxyethylthioglycolate and bis-(2-S-tetrahydropyranyl)ethoxyethoxyethyl di-thioglycolate was prepared by cooling 100 grams (0.42 equivalent of SH) of the thus prepared mixture of triethyleneglycol mono- and diesters of thioglycolic acid along with 0.2 gram of AMBERLYST 15 ion exchange resin to 0° C. and adding 39.18 grams (0.462 mole) of DHP dropwise over a period of 30 minutes. The mixture was held at 0° C. for 1 hour and then heated gradually to room temperature (about 22° C.) and held there for 2 hours. The yield of product was 139.2 grams and the SH content was 3.5%.

Preparation of Stabilizer

Said adduct and the zinc ionomer (or ZNION)described above are mixed to form an adhesion promoting stabilizer of this invention.

EXAMPLE 8

Preparation of Intermediate

A mixture of 92.0 grams (1 mole) of thioglycolic acid, 212.21 grams (2 moles) of diethyleneglycol, and 0.24 gram of p-toluene sulfonic acid was heated to 100° C. at a pressure of 200 Torr in a reactor equipped with a mechanical stirrer, a thermometer, and a vacuum take-off condenser. The temperature was held for 0.5 hour before the pressure was reduced to 10 Torr over a period of 1.9 hours and then held for 70 minutes to remove water formed by the esterification. The temperature was raised to 110° C. as the pressure was further reduced to less than 1 Torr over a period and held for 3 hours. The diethyleneglycol mono-ester of thioglycolic acid constituted 85.9% and the diester constituted 14.1% of the weight of the product. The SH content of the product was 19.49% by weight, which was satisfactory.

Preparation of Adduct

A mixture of 70 grams (0.412 equivalent) of the intermediate thus produced and 0.15 gram of AMBERLYST 15 ion exchange resin was cooled to less than 0.5° C. and then 36.52 grams (0.434 equivalent) of DHP was added dropwise over a period of about 7 minutes and after 3 hours it was warmed to room temperature (about 22° C.).

Preparation of Stabilizer

Said adduct and the zinc ionomer (or ZNION)described above are mixed to form an adhesion promoting stabilizer of this invention.

EXAMPLE 9

Preparation of Intermediate

A mixture of 188.85 grams (2.05 moles) of thioglycolic acid, 154.26 grams (1.0 mole) of dithiodiglycol, and 5.1 grams of p-toluene sulfonic acid was heated to 110° C. in a nitrogen atmosphere for 2.5 hours in a reactor equipped with a mechanical stirrer, a thermometer, and a vacuum take-off condenser to remove about 32 mls of water formed by the esterification. The SH content of the product was 20.6%. The theoretical SH content of the dithiodiglycol diester of thioglycolic acid is 21.9%).

Preparation of Adduct

A mixture of 15 grams (0.091 equivalent) of the intermediate thus produced and 8.04 grams (0.096 equivalent) of DHP was stirred and 1 drop of 70% methane sulfonic acid caused an exothermic reaction which raised the temperature to 89° C. before cooling lowered it to 40° C. The material was diluted with tetrahydrofuran and stripped at 35° C./2mm Hg for 1 hour to give a product whose SH content was less than 0.1% and an acid number of 4.2.

Preparation of Stabilizer

Said adduct and the zinc ionomer (or ZNION)described above are mixed to form an adhesion promoting stabilizer of this invention.

EXAMPLE 10

Preparation of Intermediate

A mixture of 69.30 grams (0.752 mole) of thioglycolic acid, 50 grams (0.367 mole) of pentaerythritol and 1.25 grams of p-toluene sulfonic acid was heated to 100° C. in a vacuum of about 200 mm Hg to remove water formed by the esterification. After 60 minutes, a gas chromatograph showed that the predominant product was the diester of thioglycolic acid and was satisfactory. The removal of water was finished at 15 mm Hg.

Preparation of Adduct

The general procedure of Example 9 is followed to give the desired oxy-bis(2-S-tetrahydropyranylthioglycolate) of pentaerythritol wherein $R^1$ of Formula 1 above is pentaerythrityl and y is 2.

Preparation of Stabilizer

Said adduct and the zinc ionomer (or ZNION)described above are mixed to form an adhesion promoting stabilizer of this invention.

The two hydroxyl groups of the thioglycolate may be complexed with the zinc ion of a zinc halide to form a non-adhesion promoting heat stabilizer for a halogen-containing polymer. Said stabilizer may, however, be mixed with the adhesion-promoting stabilizer as an another embodiment of the invention claimed herein.

Articles of manufacture contemplated by this invention, e.g. packaging film and tubing are formed from the stabilized compositions of this invention by any of the well-known conventional techniques for forming polymers into shaped articles.

While a few specific embodiments of this invention have been disclosed in considerable detail, variations and modifications of these embodiments can be effected without departing from the spirit and scope of the invention as disclosed and claimed herein.

The subject matter claimed is:

1. A heavy metal-free stabilizer for a poly(vinyl chloride) resin consisting essentially of from about 40% to about 80% by weight of a blocked mercaptan having the formula:

FORMULA 1

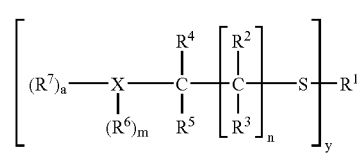

wherein a is 1, m is 0, and n is 0 or 1; y=1 to 4; $R^1$ is R'C(O)OH wherein R' is an alkylene radical having 2 or 3 carbon atoms, or $R^1$ is an alkyl, pentaerythrityl, alkylene, cycloalkyl, cycloalkylene, aryl, alkaryl, aralkyl, aralkylene, hydroxyalkyl, dihydroxyalkyl, alkoxyalkyl, acyloxyalkyl, hydroxy(polyalkoxy)alkyl, hydroxy(polyalkoxy)carbonylalkyl, acyloxy(hydroxyalkyl), acyloxy(alkoxyalkyl), acyloxy(polyalkoxy)alkyl, acyloxy(polyalkoxy)carbonlalkyl, alkoxycarbonylalkyl, oxy[bis(alkoxycarbonylalkyl)], oxy[bis(polyalkoxycarbonylalkyl)], benzoyloxy(polyalkloxy) alkyl, benzoyloxy(polyalkoxy)carbonylalkyl, alkylene bis-(acyloxyalkyl), thio-bis-[alkoxycarbonylalkyl], dithio-bis-[alkoxycarbonylalkyl], alkoxy(polyalkoxy)carbonylalkyl, hydroxyalkoxyalkyl, alkoxy(hydroxyalkyl), alkoxy(polyalkoxy)alkyl, mercaptoalkyl, mercaptoalkylene, mercaptoalkoxycarbonylalkyl, tetrahydropyranyloxy(polyalkoxy) carbonylalkyl, tetrahydropyranyloxyalkyl, hydroxyaryl, or mercaptoaryl radical, said alkyl, alkylene, alkoxy, and acyl radicals having from 1 to 22 carbon atoms; $R^2$, $R^3$, $R^4$, $R^5$, $R^6$, and $R^7$ are independently hydrogen, a hydroxyl, mercapto, alkyl, alkylene, acyl, aryl, haloaryl, alkaryl, aralkyl, hydroxyalkyl, alkenyloxyalkoxy, alkoxy, aryloxy, alkaryloxy, mercaptoalkyl, hydroxyalkylmercaptoalkyl, mercaptoalkylene, hydroxyaryl, alkoxyaryl, alkoxyhydroxyaryl, arylcarbonyl, or mercaptoaryl radical having from 1 to 22 carbon atoms; X is a heteroatom selected from the group consisting of oxygen and sulfur, and one or both of the $R^3$ and $R^5$ alkylene radicals joins with $R^7$ and X to form a heterocyclic moiety with X as the heteroatom; and a zinc ionomer.

2. The stabilizer of claim 1 wherein $R^1$ is acyloxyethyl, the acyloxy moiety contains from 12 to 18 carbon atoms, the zinc ionomer comprise a mixed salt of a carboxylic acid having from 7 to 18 carbon atoms and an oxidized polyethylene having a molecular weight of at least about 750, X is oxygen, and the heterocyclic moiety is tetrahydropyranyl.

3. A one-component PVC stabilizer consisting of a complex of a zinc salt with a latent mercaptan as shown by the following formula:

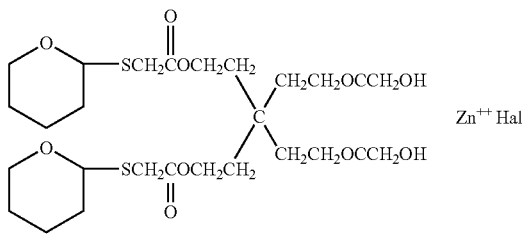

wherein Hal represents a halide ion.

4. A PVC composition comprising the stabilizer of claim 3.

5. A latent mercaptan having the following formula:

FORMULA 2

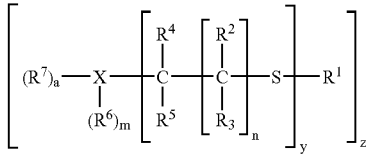

wherein a is 0 or 1, m is 0 or 1, and n is 0 or 1; y=1 to 4, when y=1, z is 1 to 4, when y is more than 1 z is 1; $R^1$ is R'C(O)OH wherein R' is an alkylene radical having 2 or 3 carbon atoms, or $R^1$ is a thio[bis(alkoxycarbonylalkyl)], dithio-bis[(alkoxycarbonylalkyl)], pentaerythrityl, alkenyloxy(polyalkoxy)alkyl, oxy[bis(alkoxyacyl)], oxy[bis(polyalkoxycarbonylalkyl)], benzoyloxy(polyalkoxy)alkyl, or benzoyloxy(polyalkoxy)carbonylalkyl radical, said alkyl, alkylene, and acyl radicals having from 1 to 22 carbon atoms; $R^2$, $R^3$, $R^4$, $R^5$, $R^6$, and $R^7$ are independently hydrogen, a hydroxyl, mercapto, alkyl, alkylenyl, acyl, aryl, haloaryl, alkaryl, aralkyl, hydroxyalkyl, chioroalkoxy, alkylene, alkenyloxyalkoxy, alkoxy, aryloxy, alkaryloxy, mercaptoalkyl, hydroxyalkylmercaptoalkyl, mercaptoalkylenyl, hydroxyaryl, alkoxyaryl, alkoxyhydroxyaryl, arylcarbonyl, or mercaptoaryl radical having from 1 to 22 carbon atoms; X is aryl, haloaryl, alkaryl, hydroxyaryl, dihydroxyaryl, aralkaryl, alkoxyaryl, arylcycloalkyl, or a heteroatom selected from the group consisting of oxygen and sulfur, with the option that one or both of the $R^3$ and $R^5$ alkylenyl radicals joins with $R^7$ and X to form a heterocyclic moiety with X as the heteroatom.

6. A zinc ionomer-free composition comprising a PVC resin and the latent mercaptan of claim 5.

7. A zinc ionomer-free composition comprising a PVC resin, the latent mercaptan of claim 5, and from about 0.005 to less than 0.5% of at least one synergist selected from the group consisting of a metallic-based heat stabilizer and a Lewis acid, based on the weight of the PVC resin.

* * * * *